United States Patent [19]
Crawford
[11] 3,767,941
[45] Oct. 23, 1973

[54] TURN-OFF CIRCUIT FOR SWITCHING TRANSISTOR

[75] Inventor: Richard D. Crawford, Los Altos, Calif.

[73] Assignee: Hewlett-Packard Company, Palo Alto, Calif.

[22] Filed: Apr. 17, 1972

[21] Appl. No.: 244,370

[52] U.S. Cl. .................. 307/263, 307/268, 307/300
[51] Int. Cl. .......................... H03k 5/12, H03k 3/26
[58] Field of Search .................... 307/280, 300, 263, 307/268

[56] References Cited

UNITED STATES PATENTS

| | | | |
|---|---|---|---|
| 3,253,160 | 5/1966 | Hall et al. | 307/300 X |
| 3,050,636 | 8/1962 | Sommerfield | 307/280 X |
| 3,566,158 | 2/1971 | Paine | 307/300 X |
| 3,569,742 | 3/1971 | Schroeder | 307/300 X |

FOREIGN PATENTS OR APPLICATIONS

| | | | |
|---|---|---|---|
| 881,182 | 11/1961 | Great Britain | 307/300 |

OTHER PUBLICATIONS

"Turnoff Circuit" by Norton in IBM Tech. Disclosure Bulletin, Vol. 7, No. 6, Nov. 1964, page 428.

"Transformer-Coupled Storage Charge Removal" by Fugere et al. IBM Tech. Disclosure Bull, Vol. 14, No. 6, Nov. 1971, page 1691.

*Primary Examiner*—Stanley D. Miller, Jr.
*Attorney*—Roland I. Griffin

[57] ABSTRACT

A switching transistor circuit for use, for example, in a switching mode regulator where the emitter-collector circuit of the transistor is coupled in a series circuit between the DC input line and the output to the load circuit, the output DC voltage level being a function of the duty cycle of the transistor, the turn-on and turn-off of the transistor being controlled by a control circuit coupled to the base of the transistor, a circuit being coupled to the base which, when operated, serves to sweep the charge from the transistor base region, and a differentiating circuit coupled across the transistor and operating at the time the voltage across the transistor starts to change when the transistor starts to turn-off to thereby enable said circuit to sweep the charge from the base region and hasten the fall time of the transistor.

5 Claims, 1 Drawing Figure

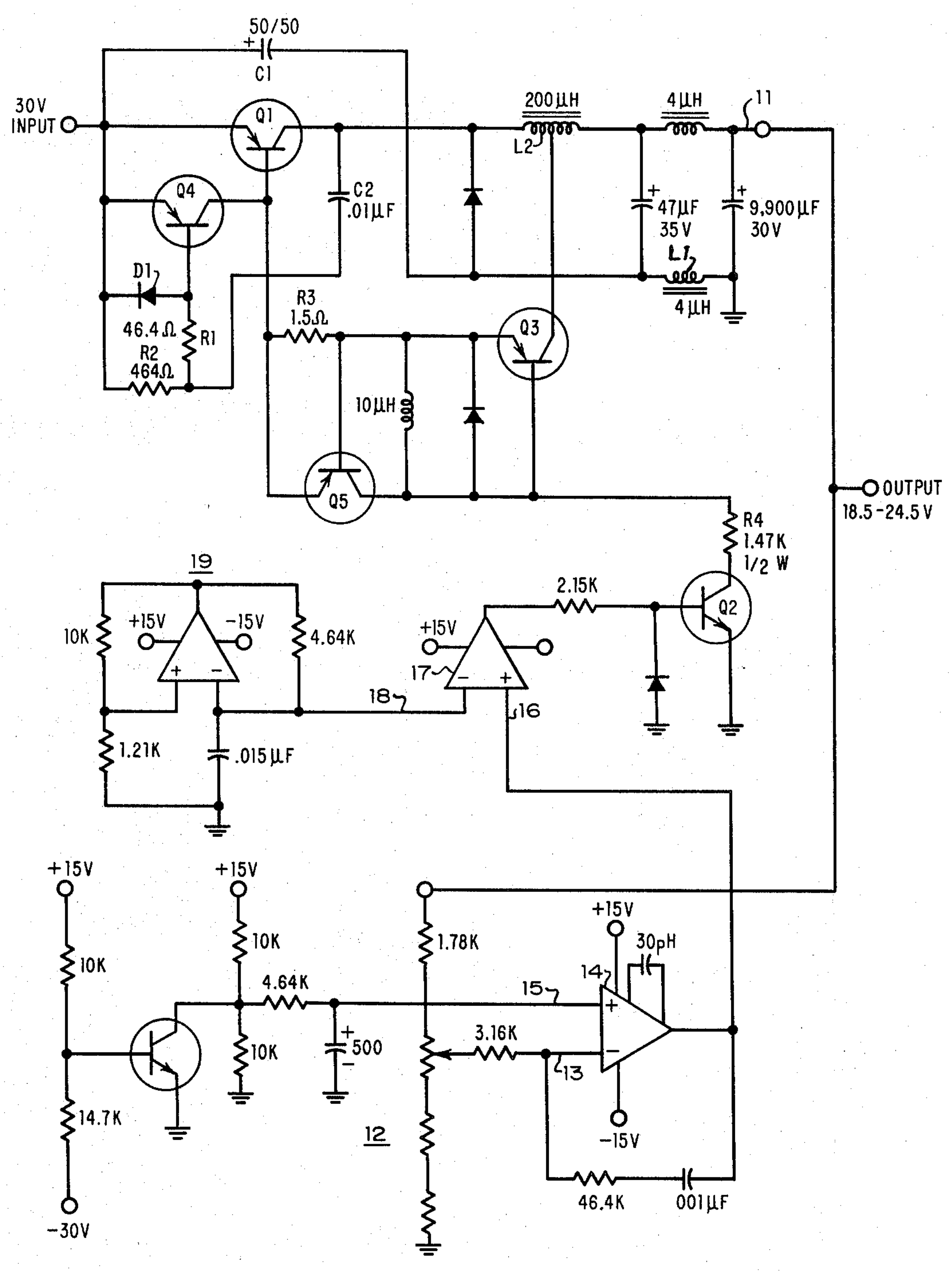
50/50
C1
30V INPUT
Q1
200µH
L2
4µH
11
Q4
C2 .01µF
47µF 35V
9,900µF 30V
L1
4µH
D1
R3 1.5Ω
Q3
46.4Ω
R1
R2 464Ω
10µH
Q5
OUTPUT 18.5-24.5V
R4 1.47K 1/2 W
19
10K
+15V
-15V
4.64K
2.15K
Q2
17
16
18
1.21K
.015µF
+15V
10K
+15V
10K
1.78K
+15V
30pH
14
4.64K
15
500
3.16K
13
10K
-15V
14.7K
12
46.4K
001µF
-30V

TURN-OFF CIRCUIT FOR SWITCHING TRANSISTOR

BACKGROUND OF THE INVENTION

Switching mode regulators wherein the emitter-collector circuit of a switching transistor is coupled between the input DC supply line and the output to the load, the regulation of the output DC voltage level being controlled by the duty cycle of the switching transistor, are in common use. The transistor duty cycle is controlled by a feedback signal derived from the output voltage, the transistor being turned on and off at the duty cycle needed to maintain the desired output voltage.

Any delay in the fall time of the switching transistor, i.e. the time between the start of the turn-off and the decay to zero, results in a power loss and it is desired that the fall time of the transistor be as short as possible.

Turn-off can be hastened by withdrawing charge from the base of the switching transistor, but to withdraw charge during the stored charge mode is inefficient because the transistor dissipation is small during this interval and because additional energy is expended in withdrawing the charge.

SUMMARY OF THE INVENTION

In the present invention a novel circuit is utilized with the switching transistor to decrease its fall time and, thus, reduce the power consumption. With the switching transistor in saturation and preparing to turn-off, it is in a stored charge mode. A circuit is coupled to the base of the switching transistor, for example, a transistor with its emitter-collector circuit coupled across the emitter-base circuit of the switching transistor, which, when operated, will rapidly sweep the charge out of the base region of the switching transistor, thus reducing the fall time. This circuit is operated by a differentiating circuit coupled across the switching transistor and becomes operative in response to the change in voltage across the switching transistor at the initiation of turn-off.

DESCRIPTION OF THE DRAWINGS

The drawing is a schematic diagram of one embodiment of the switching transistor system incorporating the present invention.

DESCRIPTION OF THE PREFERRED EMBODIMENT

Referring to the drawing the switching regulator operates on a 30V DC input to produce a regulated voltage output adjustable between, for example, 18.5 volts and 24.5 volts. This switching regulator comprises a switching transistor Q1 coupled to the input by way of a RFI filter circuit L1, C1 which isolates the 30 volt input from the switching excursions of the switching transistor Q1.

As is well known in switching regulators, the level of the output voltage at output terminal 11 is regulated by the duty cycle, i.e. on/off time, of the switching transistor Q1. This duty cycle is controlled by a feedback signal derived from the output voltage. The output voltage at terminal 11 is fed back through a resistor divider network 12 to one input 13 of a differential amplifier circuit 14; the reference voltage is coupled to the other input 15. An error signal output of amplifier 14 is generated proportional to the difference between these two inputs.

The output of amplifier 14 is fed to one input 16 of a comparator circuit 17, the other input 18 of the comparator circuit being provided with a triangular wave form input from a triangular wave form generator circuit 19. The output of the comparator circuit is a series of rectangular-shaped pulses, the width of these pulses being determined by the amplitude of the error signal from amplifier 14. These rectangular-shaped signals are utilized via Q2 as the base drive for transistor Q3 coupled to the base of Q1 in a configuration wherein the on time of transistor Q3 controls the duty cycle of the switching transistor Q1, this base drive circuit being described in more detail below.

A substantial power saving is obtained with the novel circuit of the present invention comprising the capacitor and resistor circuit C2, R1 coupled to the base of Q4 which is connected across the base-emitter region of Q1. When Q1 is in saturation and preparing to turn off, it operates in a stored charge mode. As Q1 begins to come out of saturation, there is a change in the voltage across Q1. When the voltage across Q1 changes, the capacitor-resistor network of C2, R1 differentiates that change and produces a current into the base of Q4. Q4 then turns on, sweeping the charge out of the base region of Q1. This decreases the fall time of Q1, and thus results in a reduction in the power loss during Q1 turn-off. The diode D1 provides a current path for discharging the capacitor C2 after the rise time of the switching transistor Q1 at turn-on. Resistor R2 provides an additional discharge path for the charge remaining on C2 after the initial discharge through the diodes D1 and the base-emitter junction of Q4 at the rise and fall times, respectively, of Q1.

An additional power savings is accomplished with a saturating circuit associated with the switching transistor Q1. Typical in such a switching circuit Q3 is operated in saturation and Q1 out of saturation. When Q3 is saturated, the voltage drop across Q1 is the $V_{BE}$ of Q1 plus $V_{CE\ SAT}$ of Q3. If we assume that the $V_{BE}$ is 1.5 volts and the $V_{CE\ SAT}$ of Q3 is 1 volt, there is a 2.5 volt drop and, at 6 amps, a power loss of about 15 watts. In this modified circuit, however, a tap is provided in L2 which provides a small voltage, for example 2 volts, to drive the collector of Q3 so that Q3 remains out of saturation; the switching transistor Q1 can then operate in saturation. With a forced B of 10 and operating with 6 amps in the collector, there is .6 amps in the base and, with a base-emitter drop of 1.5 volts and a $V_{CE}$ for Q3 of .5 volts, and if we assume $V_{CE\ SAT}$ of Q1 to be 1 volt, there is a 1.2 watt base drive loss and a 6 watt loss in the collector-emitter region of Q1, for a total power loss of 7.2 watts or half of the loss when operating with Q3 in saturation. In addition, the current for the base drive of Q1 is returned to the load via the collector of Q3. Although this illustration indicates a power reduction factor of two, actually in use the power reduction factor is considerably greater in many cases. Furthermore, operating Q3 out of saturation reduces its switching times.

With this arrangement where Q1 is in saturation, if a significant amount of current flows in the base of Q3, Q3 will tend to go into saturation and reduce the $V_{CE}$ as low as possible, drawing significant amounts of current through the base-to-emitter junction of Q1, resulting in excess power dissipation. It is therefore desirable to limit the current through the base of Q1 and this is accomplished by transistor Q5 and resistor R3. As current is drawn through R4, the conduction of Q3 increases and the current flow through R3 increases. When the voltage drop across R3 rises to a selected value, it turns on transistor Q5 which operates to divert current from R4 around the base-emitter circuit of Q3. This diverted current limits the current to the base of Q1, resulting in a substantial power saving.

This switching circuit comprising Q3 coupled to the base of the switching transistor Q1 is described and claimed in U.S. Pat. application Ser. No. 327,541 filed as a continuation application on Jan. 29, 1973, of U.S. Pat. application Ser. No. 144,618 filed on May 18, 1971, now abandoned, by Gregory Justice entitled "High Efficiency Power Supply" and assigned to the assignee of this application.

What is claimed is:

1. A switching transistor turn-off circuit for removing stored charge to decrease the fall time of a switching transistor, said circuit comprising:

a switching transistor having its emitter-collector circuit in series between a supply and a load circuit;

first circuit means coupled to the base of said switching transistor for turning said switching transistor on and off;

second circuit means coupled to the base of said switching transistor for sweeping the stored charge out of the base region of said switching transistor to hasten the transistor fall time; and third circuit means coupled to said switching transistor for differentiating the voltage across said switching transistor, said third circuit means operating to render said second circuit means operative for sweeping the stored charge out of the base region of said switching transistor after said switching transistor comes out of saturation.

2. A switching transistor circuit as in claim 1 wherein said second circuit means comprises a control transistor with its emitter-collector circuit coupled across the base-emitter region of said switching transistor, the base of said control transistor being coupled to said third circuit means.

3. A switching transistor circuit as in claim 2 wherein said third circuit means comprises a capacitor-resistor network coupled across the emitter-collector circuit of said switching transistor.

4. A switching transistor circuit as in claim 3 including means coupled to said third circuit means for discharging a capacitor of said capacitor-resistor network after the rise time of said switching transistor.

5. A switching circuit as in claim 4 wherein said latter means comprises a diode, and including an additional circuit coupled to said third circuit means for discharging any charge remaining on said capacitor after initial discharge through said diode or said emitter-collector circuit of said control transistor.

* * * * *

UNITED STATES PATENT OFFICE
CERTIFICATE OF CORRECTION

Patent No. 3,767,941 Dated October 23, 1973

Inventor(s) Richard D. Crawford

It is certified that error appears in the above-identified patent and that said Letters Patent are hereby corrected as shown below:

Column 2, line 48, change "B" to -- $\beta$ --.

Signed and sealed this 5th day of March 1974.

(SEAL)
Attest:

EDWARD M.FLETCHER,JR.
Attesting Officer

C. MARSHALL DANN
Commissioner of Patents